United States Patent
Kuriyama

(10) Patent No.: US 10,421,014 B2
(45) Date of Patent: Sep. 24, 2019

(54) INFORMATION PROCESSING SYSTEM AND INFORMATION PROCESSING PROGRAM

(71) Applicant: DeNA Co., Ltd, Tokyo (JP)

(72) Inventor: Kazuki Kuriyama, Tokyo (JP)

(73) Assignee: DENA CO., LTD., Tokyo (JP)

( * ) Notice: Subject to any disclaimer, the term of this patent is extended or adjusted under 35 U.S.C. 154(b) by 50 days.

(21) Appl. No.: 15/265,311

(22) Filed: Sep. 14, 2016

(65) Prior Publication Data

US 2017/0072310 A1 Mar. 16, 2017

(30) Foreign Application Priority Data

Sep. 15, 2015 (JP) ................................. 2015-181609

(51) Int. Cl.
| | | |
|---|---|---|
| A63F 13/49 | (2014.01) | |
| A63F 13/35 | (2014.01) | |
| A63F 13/335 | (2014.01) | |
| A63F 13/822 | (2014.01) | |

(52) U.S. Cl.
CPC ............ *A63F 13/49* (2014.09); *A63F 13/335* (2014.09); *A63F 13/35* (2014.09); *A63F 13/822* (2014.09); *A63F 2300/535* (2013.01)

(58) Field of Classification Search
CPC .......... A63F 13/00; A63F 13/35; A63F 13/47; A63F 13/497; A63F 13/3237; A63F 13/49; A63F 13/335; A63F 13/822; G07F 17/3237

See application file for complete search history.

(56) References Cited

U.S. PATENT DOCUMENTS

| | | | | |
|---|---|---|---|---|
| 2014/0179428 A1* | 6/2014 | Miura | ..................... | A63F 13/12 463/31 |
| 2015/0375102 A1* | 12/2015 | George | ................... | A63F 13/00 463/24 |

FOREIGN PATENT DOCUMENTS

| | | |
|---|---|---|
| JP | 2004-041559 | 2/2004 |
| JP | 2013-176623 | 9/2013 |

OTHER PUBLICATIONS

Notice for Reason for Rejection for JP App No. 2015-181609 dated Oct. 19, 2015, 6 pgs.
Notice for Reason for Rejection for JP App No. 2015-181609 dated Jan. 20, 2016, 6 pgs.
Method for Effectively Utilizing Replay in "Clash of Clans", Oct. 19, 2016, published Jul. 18, 2013, 1 pgs., [online] URL: http://app.famitsu.com/20130718_195491/.

* cited by examiner

*Primary Examiner* — David Duffy
*Assistant Examiner* — Ankit B Doshi
(74) *Attorney, Agent, or Firm* — Procopio, Cory, Hargreaves & Savitch LLP

(57) ABSTRACT

A storage module is provided for storing game information that is necessary for the progress of the game. A request to allow the game to proceed is acquired from each of a plurality of players, game information is changed according to these requests and stored in the storage module, log information indicating the relation between before and after the game information is changed is stored in the storage means, the log information is used to reproduce game information older than a first point in time until the game information at the first point in time, and the reproduced game information is used to reproduce the progress of the game and provide it to a player.

5 Claims, 6 Drawing Sheets

FIG. 6

Example of game information

Object (character) of player A

| Hit points | Attack strength | Defense strength | Position |
|---|---|---|---|
| 57 | 23 | 18 | (10,12) |

Object (character) of player B

| Hit points | Attack strength | Defense strength | Position |
|---|---|---|---|
| 60 | 22 | 19 | (12,12) |

Object (character) of player C

| Hit points | Attack strength | Defense strength | Position |
|---|---|---|---|
| 105 | 30 | 25 | (10,25) |

Object (character) of player D

| Hit points | Attack strength | Defense strength | Position |
|---|---|---|---|
| 45 | 15 | 13 | (14,26) |

FIG. 7

Example of log information

| Clock time | Details of Play | Details of change to game information |
|---|---|---|
| . | . | . |
| . | . | . |
| . | . | . |
| 2015/8/31 15:04:02 | Attack by player C on Player A | Reduce hit points of player A by three |
| 2015/8/31 15:04:05 | Movement of player D | Move position of player D two spaces to the right |
| 2015/8/31 15:04:15 | Attack by player A on player C | Reduce hit points of player C by two |

INFORMATION PROCESSING SYSTEM AND INFORMATION PROCESSING PROGRAM

The present application claims the benefit of Japanese Patent Application No. 2015-181609, filed on Sep. 15, 2015, the content of which is incorporated herein in its entirety by reference.

BACKGROUND

1. Technical Field

The present invention relates to an information processing system and an information processing program.

2. Related Art

There are known multiplayer games in which terminals used by a plurality of players in an online game or the like are connected by a network, and a plurality of players can participate in a game at the same time.

A technique has been disclosed (Patent Document 1) in which a plurality of players are matched up and allowed to join a multiplayer game on the basis of predetermined matching conditions.

PRIOR-ART LITERATURE

Patent Literature

[Patent Document 1] Japanese Patent Application No. 2013-176623

SUMMARY OF THE INVENTION

Problems to be Solved by the Invention

However, when a new player joins a multiplayer game that is already underway, the player that is joining the in-progress game can find it difficult to get up to speed on the current game situation, so a problem is that the player cannot jump immediately into the game.

SUMMARY

In view of this, it is an object of the present invention to provide an information processing system and an information processing program (e.g., non-transitory computer-readable medium including stored instructions executable by a processor) with which a player who has newly joined a multiplayer game can easily grasp the situation of the game.

One aspect of the present invention is an information processing system that provides a participation type of multiplayer game, said information processing system comprising: a storage means for storing game information that is necessary for the progress of the game; a request acquisition means for acquiring a request to allow the game to proceed from each of a plurality of players; a game processing means for changing the game information according to the request, and storing it in the storage means; a log storage processing means for storing in the storage means log information indicating the relation between before and after the game information is changed by the game processing means a game information reproduction means for using the log information to reproduce game information older than a first point in time until the game information at the first point in time; and a game reproduction means for using the game information reproduced by the game information reproduction means to reproduce the progress of the game and provide it to a player.

Another aspect of the present invention is an information processing program (e.g., non-transitory computer-readable medium including stored instructions executable by a processor) that provides a participation type of multiplayer game, said information processing program causing a computer, which is capable of accessing a storage means for storing game information that is necessary for the progress of the game, to function as: a request acquisition means for acquiring a request to allow the game to proceed from each of a plurality of players; a game processing means for changing the game information according to the request, and storing it in the storage means; a log storage processing means for storing in the storage means log information indicating the relation between before and after the game information is changed by the game processing means; a game information reproduction means for using the log information to reproduce game information older than a first point in time until the game information at the first point in time; and a game reproduction means for using the game information reproduced by the game information reproduction means to reproduce the progress of the game and provide it to a player.

Here, the game information reproduction means uses the log information to reproduce the game information older than the first point in time until the game information at the first point in time when a new player has joined the game, and it is preferable that the game reproduction means uses the game information reproduced by the game information reproduction means to reproduce the progress of the game and provide it to the new player.

Additionally, it is preferable that the log storage processing means comprises a synchronization determination means for storing as log information at least part of the game information changed by the game processing means, comparing the newest game information stored in the storage means with the game information stored as the log information, and determining whether or not the newest game information and the log information have been synchronized.

Effects of the Invention

With the present invention, the situation in a game can be easily grasped by a player who has newly joined a multiplayer game.

BRIEF DESCRIPTION OF THE DRAWINGS

FIG. 6 A diagram illustrating an example of the registration of game information in an embodiment of the present invention.

FIG. 7 A diagram illustrating an example of the registration of log information in an embodiment of the present invention.

DETAILED DESCRIPTION

Figure 1:
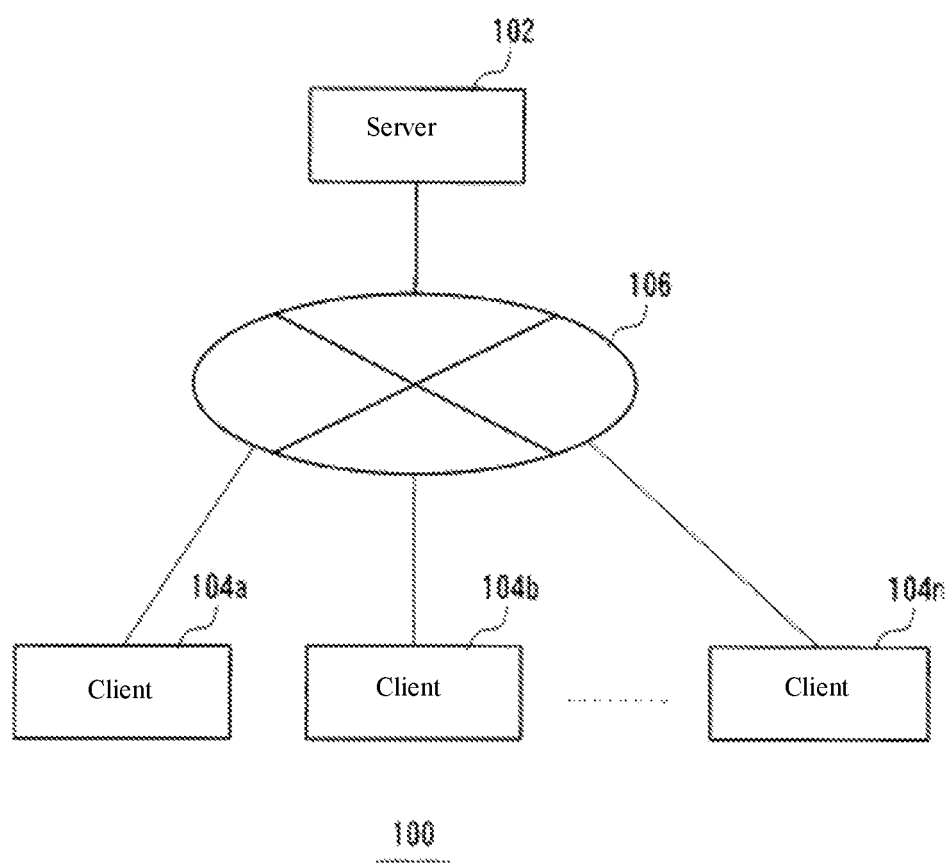
FIG. 1 A diagram illustrating the configuration of an information processing system in an embodiment of the present invention.

As shown in FIG. 1, an information processing system 100 in an embodiment of the present invention includes a server 102 and a client 104. The server 102 and the client 104 are connected via the Internet or another such information communication network 106 so that information can be exchanged. In this embodiment, we will describe a mode of providing a multiplayer game in which a plurality of players can participate from the server 102, and the server 102 is connected to a plurality of clients 104 (104a, . . . , 104n).

Figure 2:
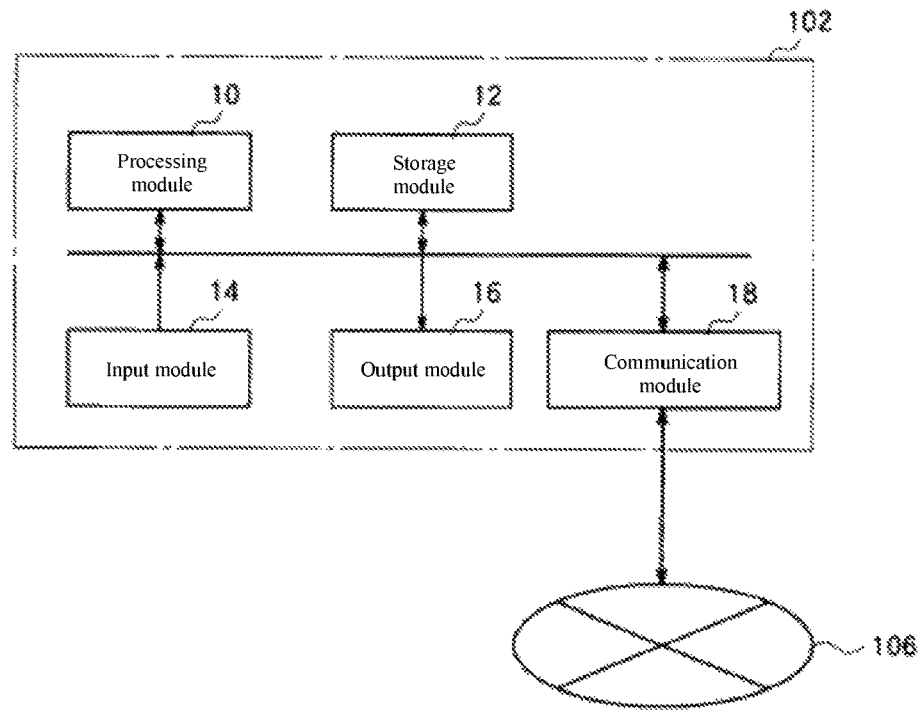
FIG. 2 A diagram illustrating the configuration of a server in an embodiment of the present invention.

As shown in FIG. 2, the server 102 includes a processing module 10, a storage module 12, an input module 14, an output module 16, and a communication module 18. The processing module 10 includes means for performing arithmetic processing, such as a CPU, or the like. The processing module 10 executes a game-provision program (e.g., non-transitory computer-readable medium including stored instructions executable by a processor) that is stored in the storage module 12, and thereby has the function of providing a multiplayer game in which a plurality of clients 104 are connected in the information processing system 100 of this embodiment. The storage module 12 includes storage means, such as a semiconductor memory, a memory card, or the like. The storage module 12 is accessibly connected to the processing module 10 and stores game-provision programs and the information required for their processing. The input module 14 includes means for entering information. The input module 14 has, for example, a keyboard, a touchscreen panel, buttons, or the like for receiving input from the administrator. The output module 16 includes a user interface screen (UI), etc., for accepting input information from the administrator and means for outputting the results of processing by the server 102. The output module 16 is provided with a display that, for example, presents images to the administrator. The communication module 18 includes an interface for exchanging information with the client 104 via the information communication network 106. Communication via the communication module 18 may be either wired or wireless.

Figure 3:
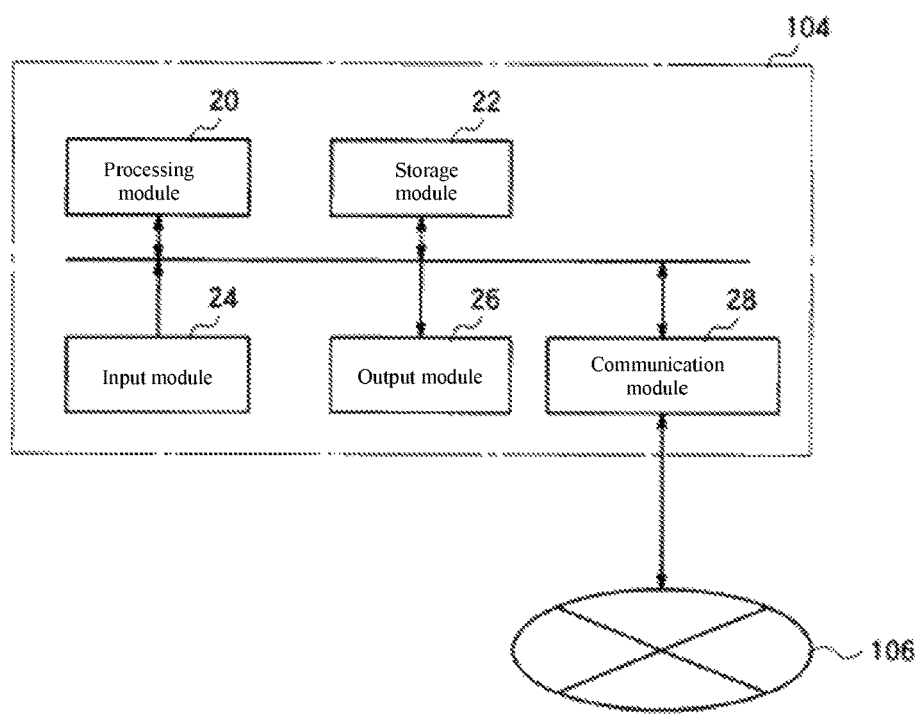
FIG. 3 A diagram illustrating the configuration of a client in an embodiment of the present invention.

As shown in FIG. 3, the client 104 includes a processing module 20, a storage module 22, an input module 24, an output module 26, and a communication module 28. The processing module 20 includes means for performing arithmetic processing, such as a CPU, or the like. The processing module 20 executes a client program (e.g., non-transitory computer-readable medium including stored instructions executable by a processor) that is stored in the storage module 22, and thereby functions as a multiplayer game terminal in the information processing system 100 in this embodiment. For example, the client program performs image display processing and input processing in a multiplayer game provided from a client 104 by utilizing a web browser function in the client 104. The storage module 22 includes storage means, such as a semiconductor memory, a memory card, or the like. The storage module 22 is accessibly connected to the processing module 20 and stores the client programs and the information required for their processing. The input module 24 includes means for entering information. The input module 24 has, for example, a keyboard, a touchscreen panel, buttons, or the like for receiving input from the user. The output module 26 includes means for outputting information that is required for processing at the client 104, such as a screen presenting posted information, or a user interface screen (UI) for receiving input information from the user. The output module 26 is provided with a display that, for example, presents images to the user. The communication module 28 includes an interface for exchanging information with the server 102 via the information communication network 106. Communication via the communication module 28 may be either wired or wireless.

The client 104 can be, for example, a personal computer, a tablet terminal, a smart phone terminal, a mobile telephone, or the like.

In this embodiment, we will describe an example in which players A and B using clients 104a and 104b connected to the server 102 are playing a battle-type multiplayer game against players C and D using clients 104c and 104d. In this game, players A and B form a first group, and players C and D form a second group. The game proceeds as the first group and the second group take turns.

Figure 4:
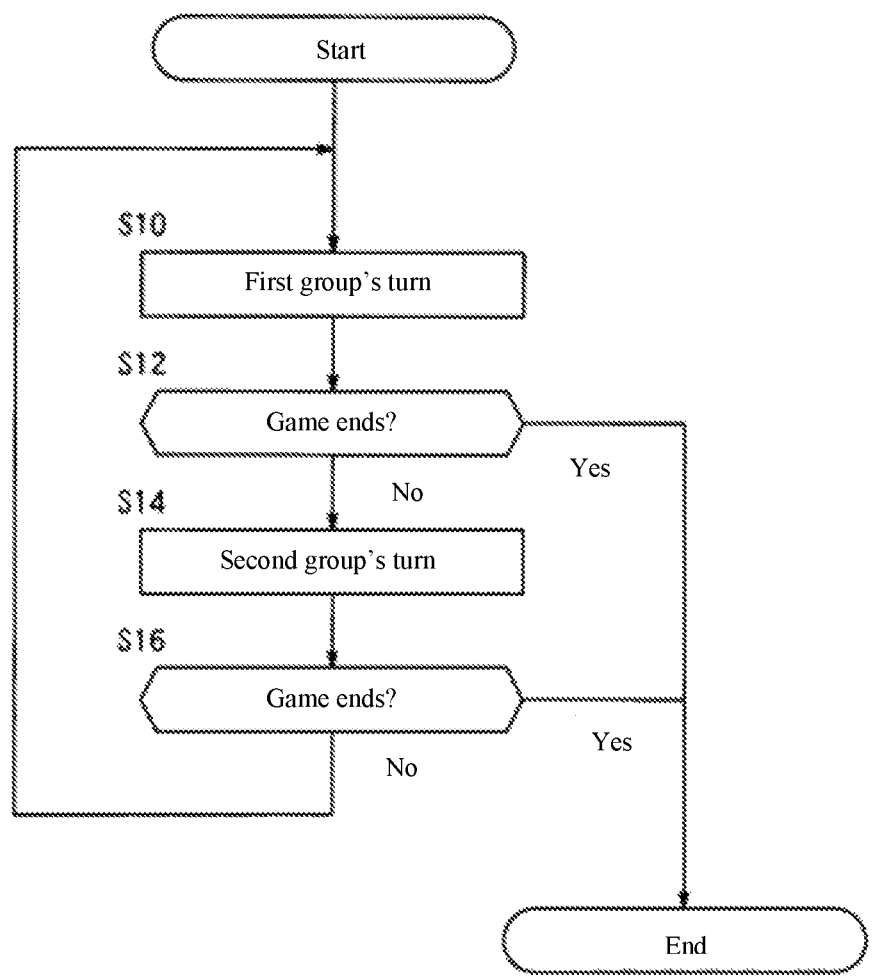
FIG. 4 A flowchart illustrating the progression of a game in an embodiment of the present invention.

Specifically, as shown in the flowchart in FIG. 4, a player belonging to the first group takes a turn at play (step S10), and if a condition of ending the game when this turn is complete is reached, the game is ended (step S12). If the game is not to be ended, a player belonging to the second group takes a turn at play (step S14), and if a condition of ending the game when this turn is complete is reached, the game is ended (step S16). If the game is not to be ended, the processing goes back to step S10, and repeats from the turn of a player belonging to the first group.

How the groups take turns may be varied according to the game, such as ending the turn each time a player makes a play (an action within the game), or ending at the point when a certain amount of time has elapsed since the start of the game.

Figure 5:
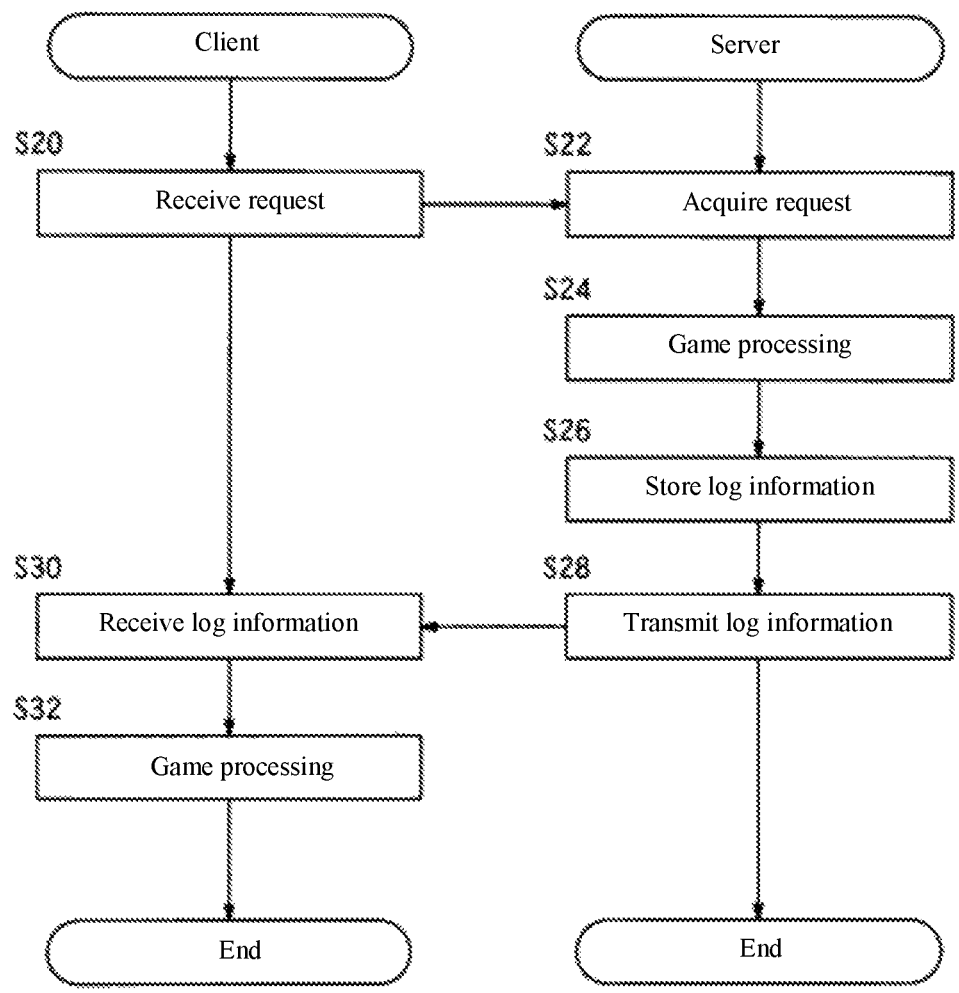
FIG. 5 A flowchart illustrating game processing according to requests in an embodiment of the present invention.

The processing performed when players of each group take their turns at play will now be described through reference to the flowchart in FIG. 5. Since the play during each player's turn is processed the same way for all players, here we will describe an example of the processing when player A uses the client 104a to play.

In step S20, a request is received from the client 104a. The processing in this step causes the client 104a to function as a request reception means. The client 104a receives a play request inputted by a player with the input module 24. The request may be, for example, a request to move a game object (character) belonging to player A, or a request to attack an object (character) belonging to an opponent (a player in the second group), or the like. The inputted request is sent from the client 104a to the server 102.

In step S22, a request is acquired by the server 102. The processing in this step causes the server 102 to function as a request acquisition means. The server 102 receives the request sent from the client 104a in step S20 via the information communication network 106.

In step S24, the server 102 performs game processing according to the request. The processing in this step causes the server 102 to function as a game processing means. The processing module 10 of the server 102 analyzes the request acquired in step S22 and executes game processing.

An example of game processing is processing to move an object (character) of player A on the game screen. In this processing, the position of player A's object stored as game information in the storage module 22 is read out, this position is changed according to the acquired request, and the position of the object of player A included in the game information of the storage module 22 is updated with the new position. Another example of game processing is processing to attack an object of an opponent (a player belonging to the second group) from an object of player A. In this processing, the hit points for an object of an opponent (such as player C who belongs to the second group) stored as game information in the storage module 22 are read out, hit points are reduced by the read-out value in response to the acquired request, and the hit points of an object of an opponent (such as player C who belongs to the second group) included in the game information in the storage module 22 are updated with the new value. Game processing according to a request is not limited to the above.

For example, game information is registered as shown in FIG. 6. FIG. 6 shows an example in which information related to an object (character) used by a player is registered as game information. In this example, the remaining hit points, the attack power, the defense power, and the position (coordinates on the game screen) of the objects of players A to D are registered. However, the game information is not limited to this, and encompasses any information used in the game provided by the server 102.

The game information should be recorded in a state that allows it to be accessed by the server 102 as needed. The game information does not necessarily have to be such that all of the information used in a game is registered in a single database. Also, not all of the game information needs to be stored in the storage module 12 of the server 102, and some or all of the game information may be stored in the storage module 22 of the client 104, or in an external device that can be accessed from the server 102.

In step S26, log information is recorded for game processing at the server 102. The processing in this step causes the server 102 to function as a log storage processing means. The processing module 10 of the server 102 stores the game processing executed in step S24 as log information in the storage module 22.

If, for example, game processing is performed to move an object (character) of player A on the game screen, log information can be information indicating how much and in which direction the object of Player A was moved. Specifically, the difference between the positions of the object of player A before and after movement is registered as log information in the storage module 22. Also, if game processing is performed to attack player C, for example, log information can be information indicating by how many hit points an object of player C was reduced. Specifically, the difference between the hit points before and after an attack on the object of player C is registered as log information in the storage module 22.

At this point, as shown in the log information registration example of FIG. 7, it is preferable if a game ID and object ID for identifying the game and object to be processed are associated with information indicating the change in game information produced by processing and the details of the processing, and the result is stored as log information in the storage module 22. Here, as an example of log information, etc., there may be a case in which the last play up to the current time was a play according to an attack request from player A, and the hit points of the object (character) of player C were reduced by two points in game processing for this request. When changes have occurred in the game information in game processing according to requests from a player, the log information is added in the order in which the changes occurred.

In step S28, log information is sent from the server 102 to the client 104 as details of the change in game information according to a request. The processing in this step causes the server 102 to function as a game information transmission means. The server 102 sends log information, as updated details of game information executed in step S24, to all of the clients 104 used by players participating in the game.

For example, if an object of player C is attacked at the request of player A, then the reduced value of hit points for player C is sent as updated details of game information for both the attacking object of player A and the attacked object of player C.

In step S30, log information is acquired by the clients 104. The processing in this step causes each client 104 to function as game information acquisition means. Each of the clients 104 receives log information (updated details of game information) sent from the server 102 in step S28.

Here, the information exchanged between the server 102 and the clients 104 need not be all of the game information necessary to perform display and so forth according to the progress of the game at the client 104, and may be just information related to the game information changed in step S24.

For instance, if an object of player C is attacked at the request of player A, the hit points for the object of player C will be reduced according to the updated details of game information received at each client 104. In response to this, processing is performed to change the current value displayed for hit points of the object of player C displayed on the game screen, and so on. Also, processing may be performed to display on the game screen the scene in which an attack on the attacked object of player C was carried out by the attacking object of player A, and so on.

In step S32, processing is performed according to the details of game progress at the client 104. The processing in this step causes each client 104 to function as a client game processing means. At each of the clients 104, processing is performed according to the updated details of game information received in step S30, and according to the details of game progress, such as changes to the display on the game screen.

The processing when a request is sent from one client 104a to the server 102 is executed as discussed above. Processing can be similarly executed when a request is received by a client 104 used by another player participating in the game. The game proceeds as the players belonging to each group take their turns and this processing is performed.

Figure 8:
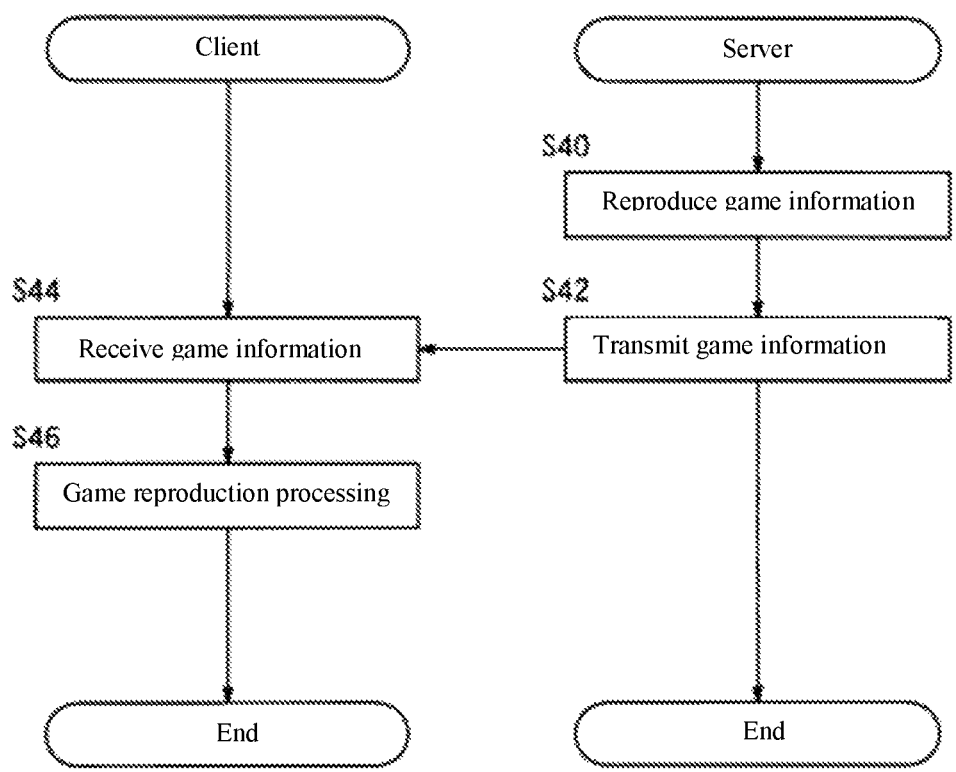
FIG. 8 A flowchart illustrating game reproduction processing in an embodiment of the present invention.

Next, processing in which the game history is reproduced when a new player has joined the game will be described through reference to the flowchart in FIG. 8. Here, let us assume that a player E has just joined the game as a new player, before game history reproduction is performed.

In step S40, processing to reproduce game information is performed by the server 102. The processing in this step causes the server 102 to function as a game information reproduction means. The server 102 reads out the log information already stored for the game that the new player E has joined, in the newly registered order, going back to either a specific clock time or a specific turn. The server 102 reproduces past game information according to the log information that has been read out. At this point the server 102 reads out the current game information if it is necessary for reproduction, and restores the past game information from the current game information according to log information.

For example, in the example of log information shown in FIG. 7, the most recent log information is that the "play" is "an attack by player A on player C," and as a result, the "change to game information" is that "the hit points of player C are reduced by two." In view of this, the server 102 reads out the current hit points for the object (character) of the player C, and adds two to this number to restore the game information prior to the registration of this log information. Similarly, game information is also reproduced from log information further in the past. In this way, past game information is reproduced from the point when a new player joined the game (first point in time) until the point when reproduction is commenced, which is before a certain clock time or a certain turn.

In step S42, the reproduced game information is transmitted from the server 102 to the client 104 used by the new player. The processing in this step causes the server 102 to function as a reproduced game information transmission means.

In step S44, game information is received by the client 104 used by the new player. The processing in this step causes the client 104 to function as a reproduced game information reception means. The client 104 used by the new player receives the game information sent from the server 102 in step S42.

In step S46, the past game situation is reproduced by the client 104. The processing in this step causes the client 104 to function as a game reproduction means. The client 104 that has received game information in step S44 uses the received game information to reproduce the past game progress. Specifically, the past game information reproduced from log information in step S40 is used to reproduce game information on the game screen, from the point when reproduction commenced until the point when the new player joined the game.

Thus, in an embodiment of the present invention, the game progress situation produced so far by the other players can be reproduced and presented to a player who has just joined the game. Therefore, this new player can grasp the game progress situation, and merge smoothly into the game.

In this embodiment, the reproduction commencement point was automatically set to be before a certain clock time or a certain turn when a new player joins the game, but the reproduction commencement point may instead be set according to a request from the new player.

Also, if the latest log information and the latest game information are acquired when past game information is reproduced, this should fundamentally occur in a state in a which the data are synchronized, but depending on the timing at which the data was acquired, it is conceivable that the log information will have been updated, but the most recent state is not reflected by the game information, or vice versa. In view of this, several sets of past log information may be acquired, and processing may be performed to confirm whether or not the log information is synchronized with the game information.

Here, rather than using the difference between before and after a change in the game information, the log information may be stored as the changed value itself. In this case, the most recent game information and the game information stored as the log information can be compared to determine whether or not the data are synchronized, depending on whether or not the value of the most recent game information matches the value registered in the log information.

DESCRIPTION OF REFERENCE NUMERALS

10 Processing module, 12 Storage module, 14 Input module, 16 Output module, 18 Communication module, 20 Processing module, 22 Storage module, 24 Input module, 26 Output module, 28 Communication module

The invention claimed is:

1. An information processing system that provides a participation type of an in-progress multiplayer game, said information processing system comprising:
   a storage for storing game information that is necessary for progress of the in-progress multiplayer game;
   a server that is configured to, for an occurrence of an addition of a new player to the in-progress multiplayer game before the game information is reproduced:
      acquire a request to allow the in-progress multiplayer game to proceed from each of a plurality of players participating in the in-progress multiplayer game;
      change the game information according to the request, and storing the changed game information in the storage;
      store in storage log information indicating a relation between before and after the game information is changed; and
      use the log information to reproduce game information older than a first point in time of when the new player enters the in-progress multiplayer game until the game information reaches the first point in time, wherein the server uses the log information to reproduce the game information from older than the first point in time to the first point in time when the new player has joined the in-progress multiplayer game, and the game information reproduced by the server to reproduce the progress of the in-progress multiplayer game is configured to be provided by a client of the new player, such that the client of the new player reproduces the in-progress multiplayer game from the game information from a time older than the first point in time to the first point in time when the new player is added to the in-progress multiplayer game.

2. The information processing system according to claim 1, wherein the server is configured to store as log information at least part of the game information changed by the server, compare newest game information stored in the storage with the game information stored as the log information, and determine whether or not the newest game information and the log information have been synchronized.

3. A non-transitory computer-readable medium including stored instructions executable by a processor, that provides a participation type of an in-progress multiplayer game, said stored instructions causing the processor, which is capable of accessing a storage that stores game information for progress of the in-progress multiplayer game, to perform the instructions that comprise, for an occurrence of an addition of a new player to the in-progress multiplayer game before the game information is reproduced:
   acquiring a request to allow the in-progress multiplayer game to proceed from each of a plurality of players participating in the in-progress multiplayer game;
   changing the game information according to the request, and storing the changed game information in the storage;
   storing, in the storage, log information indicating a relation between before and after the game information is changed by the changing;
   using the log information to reproduce the game information from older than a first point in time of when the new player enters the in-progress multiplayer game until the game information reaches the first point in time; and using the log information to reproduce game information older than the first point in time of when the new player enters the in-progress multiplayer game until the game information reaches the first point in time, using the log information to reproduce the game information from older than the first point in time to the first point in time when the new player has joined the in-progress multiplayer game, and wherein the game information used to reproduce the progress of the in-progress multiplayer game is configured to be provided by a client of the new player, such that the client of the new player reproduces the in-progress multiplayer game from the game information from a time older than the first point in time to the first point in time when the new player is added to the in-progress multiplayer game.

4. An information processing system that provides a participation type of an in-progress multiplayer game, said information processing system comprising:

a storage configured to store game information that is necessary for progress of the in-progress multiplayer game; and a processor comprising instructions to execute:

acquiring a request to allow the in-progress multiplayer game to proceed from each of a plurality of players participating in the in-progress multiplayer game;

changing game information according to the request, and storing the changed game information in the storage means;

storing log information in the storage, the log information indicating a relation between before and after the game information is changed by the in-progress multiplayer game;

for an occurrence of an addition of a new player to the in-progress multiplayer game before the game information is reproduced, using the log information to reproduce game information older than a first point in time of when the new player joins the in-progress multiplayer game until the game information reaches the first point in time; and utilizing the log information to reproduce the game information from older than the first point in time to the first point in time when the new player has joined the in-progress multiplayer game, and wherein the game information used to reproduce the progress of the in-progress multiplayer game is configured to be provided by a client of the new player, such that the client of the new player reproduces the in-progress multiplayer game from the game information from a time older than the first point in time to the first point in time when the new player is added to the in-progress multiplayer game.

5. The information processing system according to claim 4, the processor further comprising instructions to execute storing as the log information at least part of the game information changed, comparing newest game information stored in the storage with the game information stored as the log information, and determining whether or not the newest game information and the log information have been synchronized.

\* \* \* \* \*